(12) United States Patent
Greenwald et al.

(10) Patent No.: US 7,558,725 B2
(45) Date of Patent: Jul. 7, 2009

(54) METHOD AND APPARATUS FOR MULTILINGUAL SPELLING CORRECTIONS

(75) Inventors: Charles M. Greenwald, Dayton, OH (US); David E. Hilton, Dayton, OH (US); Vladimir Nayfeld, Cincinatti, OH (US); Keith D. Young, Sabrina, OH (US)

(73) Assignee: LexisNexis, a division of Reed Elsevier Inc., Miamisburg, OH (US)

( * ) Notice: Subject to any disclaimer, the term of this patent is extended or adjusted under 35 U.S.C. 154(b) by 341 days.

(21) Appl. No.: 11/438,289

(22) Filed: May 23, 2006

(65) Prior Publication Data

US 2007/0276653 A1    Nov. 29, 2007

(51) Int. Cl.
G06F 17/20 (2006.01)
(52) U.S. Cl. .................... 704/1; 704/10; 704/9
(58) Field of Classification Search .............. 704/1, 704/4, 6, 7, 8, 10, 3, 9, 251, 257; 707/100, 707/5–7, 2–3, 102; 715/533, 532, 257
See application file for complete search history.

(56) References Cited

U.S. PATENT DOCUMENTS

| | | | |
|---|---|---|---|
| 4,979,227 A | 12/1990 | Mittelbach et al. | |
| 5,251,316 A | 10/1993 | Anick et al. | |
| 5,604,897 A | 2/1997 | Travis | |
| 5,774,588 A | 6/1998 | Li | |
| 5,875,443 A | 2/1999 | Nielson | |
| 5,926,811 A | 7/1999 | Miller et al. | |
| 6,401,084 B1 | 6/2002 | Ortega et al. | |
| 6,601,059 B1 | 7/2003 | Fries | |
| 6,848,080 B1 | 1/2005 | Lee et al. | |
| 6,904,402 B1* | 6/2005 | Wang et al. ................. 704/10 |
| 7,113,950 B2* | 9/2006 | Brill et al. ................. 707/100 |
| 7,243,095 B2* | 7/2007 | Chang et al. ................. 707/3 |
| 7,254,774 B2* | 8/2007 | Cucerzan et al. ............ 715/257 |
| 2002/0143828 A1 | 10/2002 | Montero et al. | |
| 2003/0088833 A1 | 5/2003 | Miyazaki et al. | |
| 2003/0131319 A1 | 7/2003 | Hintz | |
| 2003/0145285 A1 | 7/2003 | Miyahira et al. | |
| 2004/0194141 A1 | 9/2004 | Sanders | |
| 2004/0205672 A1 | 10/2004 | Bates et al. | |
| 2004/0250208 A1 | 12/2004 | Nelms et al. | |

OTHER PUBLICATIONS

K. Kukich, "Techniques for automically correcting words in text," ACM Comput. Surveys 24 4 (1992).
Zobel and Dart, "Finding approximate matches in large lexicons," Software—Practice and Experience 25 3 (1994), pp. 331-345.

* cited by examiner

*Primary Examiner*—Huyen X. Vo
(74) *Attorney, Agent, or Firm*—Jacobson Holman PLLC

(57) ABSTRACT

A system and method for multilingual spelling corrections employs a lexicon builder, which uses a metadata build process that extracts all words from the data source, along with their frequencies, to build a lexicon file using the data source with which a user will be working; and a spell checker algorithm, which determines the correct spelling of words used as input for a search of the data source by calculating a score value for words in the lexicon file according to a formula that distinguishes similarity between the input word from the user's search request and words contained in the lexicon file; and then rates the frequency of the input word against the words contained in the lexicon file. When a user inputs a word, words in the lexicon file are scored against the input word to determine a correct spelling or other spelling variant for the user to select.

24 Claims, 4 Drawing Sheets

METHOD AND APPARATUS FOR MULTILINGUAL SPELLING CORRECTIONS

CROSS-REFERENCE TO RELATED APPLICATIONS

Not applicable.

COPYRIGHTED MATERIAL

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

The present invention relates to the recognition and correction of misspelled words. More specifically, the invention relates to a method and apparatus that provides suggested correct spellings of input words and variant spellings of input words for users of an online database search system.

2. Related Art

The conventional approach to the recognition and correction of spelling errors is to apply various algorithms to compare a word entered by the user ("Input word") with a collection of words in a spell checker dictionary. Such dictionary is usually called a "Lexicon."

A number of various algorithms and approaches are known in the prior art. Some of these algorithms and approaches are described in K. Kukich, "Techniques for automatically correcting words in text," *ACM Comput. Surveys* 24 4 (1992), pp. 377-439; Zobel and Dart, "Finding approximate matches in large lexicons," *Software—Practice and Experience* 25 3 (1994), pp. 331-345; U.S. Pat. No. 5,604,897, entitled "Method and system for correcting the spelling of misspelled words"; and U.S. Pat. No. 5,774,588, entitled "Method and system for comparing strings with entries of a lexicon."

All known approaches depend on utilization of lexicons built upon "well respected" dictionaries of words (for example, Webster, Specialized Dictionary of Legal Terms, etc.). This lexicon build process requires human involvement to pick a dictionary that meets the purpose by "the best way." Such lexicons usually do not contain proper nouns and they are not customized for particular categories or types of data in which the user may be interested.

It is to the solution of these and other problems that the present invention is directed.

SUMMARY OF THE INVENTION

It is accordingly a primary object of the present invention to provide users of a search system with a spell checker that works equally well for various languages and language variations (for example, U.S. English and British English).

It is another object of the present invention to provide users of a search system with a spell checker that provides suggested correct spellings and variant spellings for proper nouns, such as the names of people and geographical place names, without the need for a special dictionary of proper nouns.

It is still another object of the present invention to provide users of a search system with a spell checker that is "tailored" to specific subject areas that the user is searching and to the specific country and/or region where the user is located.

These and other objects of the present invention are achieved by a system and method for multilingual spelling corrections that employs two components, a lexicon builder and a spell checker. The lexicon builder builds a lexicon file by using the data source with which a user will be working. The lexicon file is created by a metadata build process that extracts all words from the data source, along with their frequencies. The spell checker employs an algorithm to provide suggested correct spellings and variant spellings of words used as input for the user's search of the data source. In practice, the spell checker algorithm calculates a score value for words in the user-specific lexicon file according to a formula that considers two factors. The initial factor distinguishes similarity between the input word from the user's search request and words contained in the lexicon file. The next factor rates the frequency of the words contained in the lexicon file. When the user inputs a word, words in the lexicon file are scored against the input word. Accordingly, the algorithm and a correct spelling or other spelling variant is determined. The user then may select a spelling suggestion or a variant, as needed.

As used herein, "word" means a combination of alphabetic characters that are surrounded by word separators, which include, but are not limited to "white space characters" such as "space," "tab," "line-feed," and "carriage return." "Word length" means the number of characters between word separators. Combinations of alphabetic and numeric characters are not considered "words" within the context of the present invention. Also as used herein, "frequency" means the total number of occurrences of a word in the data source in which it is found.

Other objects, features, and advantages of the present invention will be apparent to those skilled in the art upon a reading of this specification including the accompanying drawings.

BRIEF DESCRIPTION OF THE DRAWINGS

The invention is better understood by reading the following Detailed Description of the Preferred Embodiments with reference to the accompanying drawing figures, in which like reference numerals refer to like elements throughout, and in which.

DETAILED DESCRIPTION OF THE PREFERRED EMBODIMENTS

Figure 1:
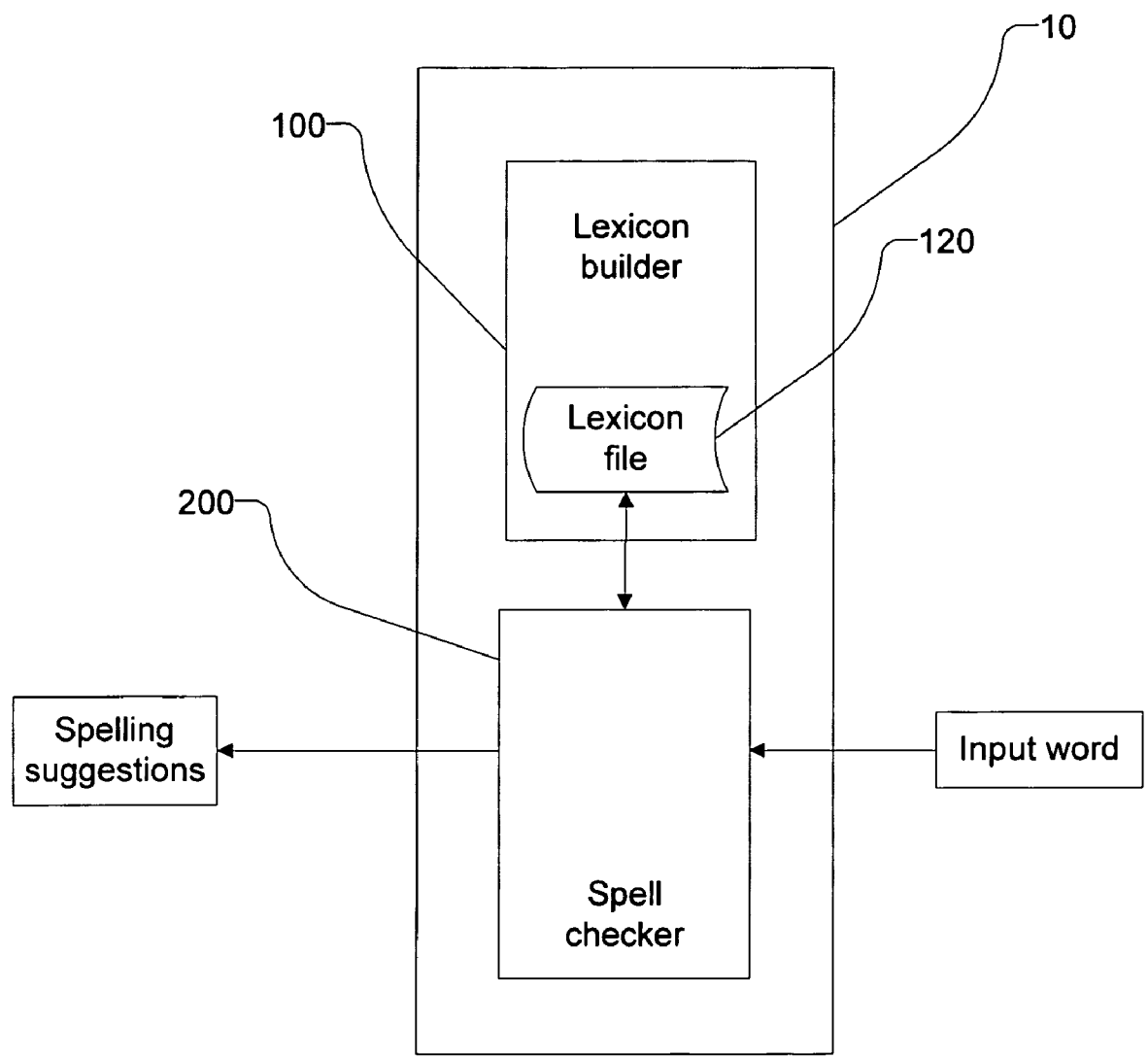
FIG. 1 is a diagram illustrating the components of the multilingual spelling corrector in accordance with the present invention.

In describing preferred embodiments of the present invention illustrated in the drawings, specific terminology is employed for the sake of clarity. However, the invention is not intended to be limited to the specific terminology so selected, and it is to be understood that each specific element includes all technical equivalents that operate in a similar manner to accomplish a similar purpose.

The present invention is described below with reference to flowchart illustrations of methods, apparatus (systems), and computer program products according to an embodiment of the invention. It will be understood that each block of the flowchart illustrations, and combinations of blocks in the flowchart illustrations, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

As shown in FIG. 1, the system and method for multilingual spelling corrections in accordance with the present invention (hereinafter referred to as "the multilingual spelling corrector 10") comprises two components, a lexicon builder 100 (shown in detail in FIG. 2) and a spell checker 200 (shown in detail in FIG. 3). The multilingual spelling corrector 10 will be described herein in connection with the Lexis™ online legal research system, which applies searches to data presented in collections of databases, but as will be understood by those of ordinary skill in the art, it can be used in connection with other search systems that search any text data presented in collections of various text files, including but not limited to online database search systems, Web sites, and text libraries.

The lexicon builder 100 builds a lexicon file by using the data source with which the user will be working. For example, U.S. users accessing the Lexis™ online legal research system work with thousands of Lexis™ databases that belong to U.S. legal and news sources, so for U.S. users, a "U.S." lexicon file is built; while users of British English accessing the Lexis™ online legal research system work with their corresponding sources, so for them, a "British" lexicon file is built. Because the multilingual spelling corrector 10 generates lexicon files from the words in the data source with which the user will be working, the lexicon files are, in effect, tailored to the data source.

If the same word is spelled in various ways in the data source, then these various spellings will all appear in the lexicon file built from that data source. Some of these variations are inevitably misspellings that would never appear in a standard dictionary. The inclusion of all of these misspelled words would make the lexicon file too large and impractical. Therefore, in practice it is desirable to include only words that are used frequently in the data source. This is accomplished by testing a word against a threshold value for frequency, prior to including it in a lexicon file, as described in greater detail hereinafter. Thus, the multilingual spelling corrector 10 provides a method of excluding "obviously misspelled" words from a lexicon file. However, before a word is excluded, it is checked for its presence in a "well-respected" dictionary, which can be accomplished by using a commercial product such as the IBM LanguageWare Linguistic Engine, or by using a custom program that provides a look-up in various, well-respected, general purpose and special topic dictionaries. If a word is not frequent but is present in the dictionary, it is still included in a lexicon file.

In a research system such as the Lexis™ legal research system, in which documents are grouped together based on data source into a predefined set of Lexis™ databases associated with respective data sources. That is, the data source is a set of databases derived from menu/library/file combinations of a database classification hierarchy specified by the user, for example, Legal, News, Patents, examples of which are shown in Table 1. A lexicon file can be built from each source, giving rise to what amounts to a set of data-specific lexicon files (e.g., case law, news, financial, public records). Therefore, in a research system such as the Lexis™ legal research system, in which documents are grouped together based on source, the multilingual spelling corrector 10 makes it possible to use a lexicon file that was built from the set of documents against which the query is targeted.

TABLE 1

| Menu | Library | File |
|---|---|---|
| Legal | Federal Legal - U.S. | Combined Restatement Rules, ALR, Jurisprudences and Law Reviews |
| Patent Law | Patents | Non-U.S. Patents |
| Patent Law | Patents | U.S. Patents |

The multilingual spelling corrector 10 thus eliminates the need for an expert judgment whether a word in the data is misspelled or spelled correctly. Such judgment is made automatically based on the frequency of the word in the data. Correctly spelled words, including proper and common nouns, occur in data much more frequently than misspellings. Therefore, the multilingual spelling corrector 10 includes in its lexicon file all words from the data sources along with their frequency.

A lexicon file is created by a metadata build process that extracts all words from a data source, along with their frequencies. For example, in the Lexis™ search system, each Lexis™ database consists of multiple files. One of those files is an inverted database file that contains a collection of all words presented in the documents that comprise a database, except for "stop" words, such as "are," "there" etc. Inverted database files contain frequency numbers for the words included therein. The lexicon builder 100 adds up the frequency numbers found for the same word throughout the data source (in the case of the Lexis™ search system, in all databases associated with a particular data source) and places the sum into the lexicon file as a "word frequency."

Although words in these inverted database files are in practice ordered alphabetically, the lexicon build process does not require that they be in alphabetical order. The lexicon builder 100 may group words by slices (word lengths) and order them alphabetically merely to expedite a look-up of words by the spell checker algorithm. However, any order of words will work for the algorithm and will not affect the quality of the spelling correction results. As long as a look-up method includes an algorithm for retrieving words to be processed by the spell checker algorithm, it will meet the needs of the present invention.

The process employed by the lexicon builder 100 also does not require the data source or databases to have frequency numbers. It is only necessary that the lexicon builder 100 determines the total frequency number of each word in the data source (or all input databases) and places this number in the lexicon file as the frequency for each word. Character strings with non-alphabetic characters (including numeric and punctuation characters) are excluded from the lexicon file 120. Although word frequency is calculated by the lexicon builder 100, it is actually employed only by the spell checker 200, and not by the lexicon builder 100. The record for every word in the lexicon file 120 includes two fields: (1) word and (2) frequency. Words in lexicon files may, but do not have to be, arranged in alphabetical order or by slice (word length).

The lexicon builder 100 preferably includes a print utility that prints various data items and data points from the lexicon file relating to word length, word frequency, and number of words in the lexicon file. The lexicon builder 100 also includes a process for controlling all the processes and jobs that make up the lexicon builder 100. This control process controls the execution and dependencies for all the jobs.

Figure 2:
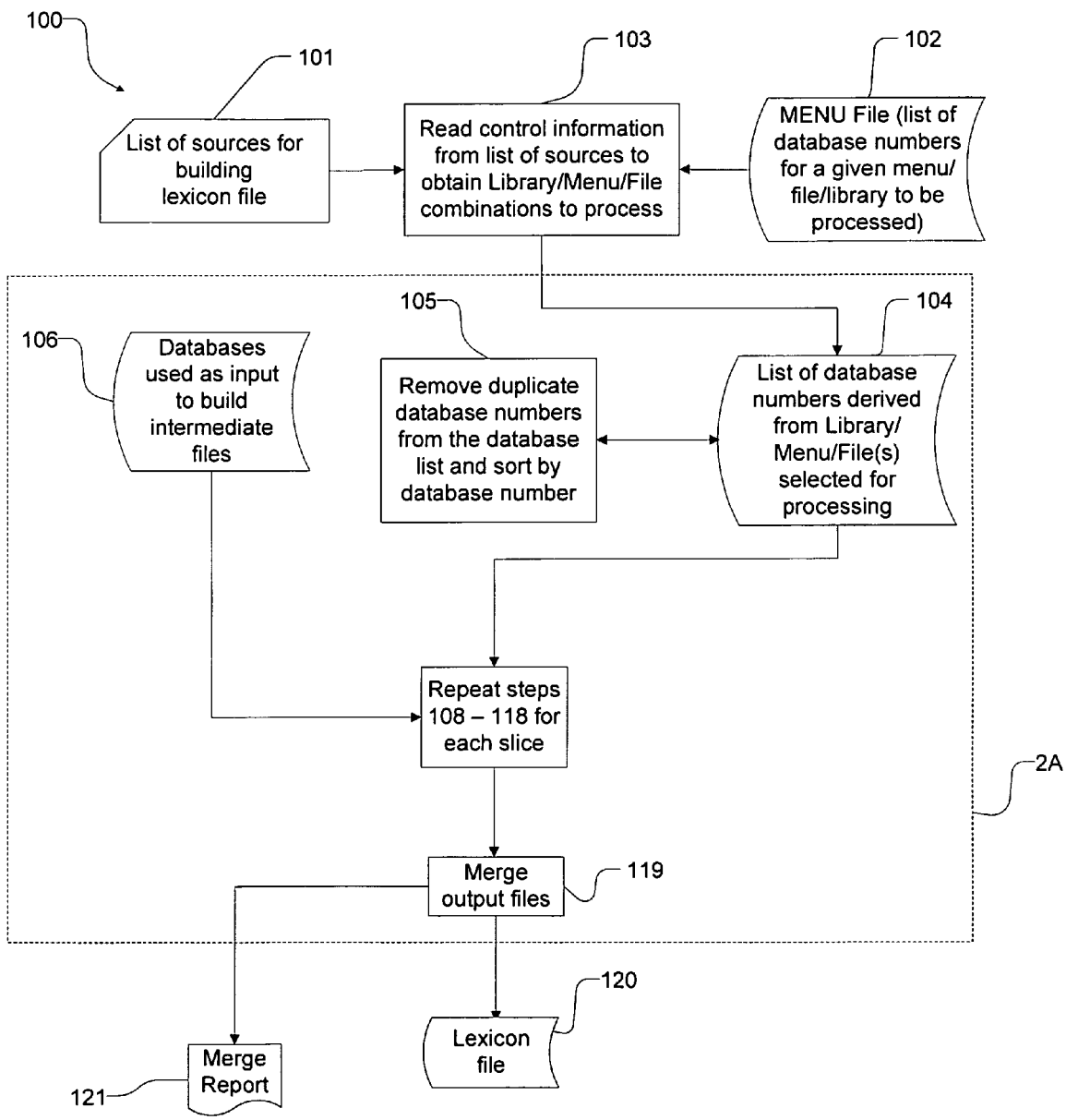
FIG. 2 is a high level flow diagram illustrating the lexicon building process in according to the present invention.
Figure 2A:
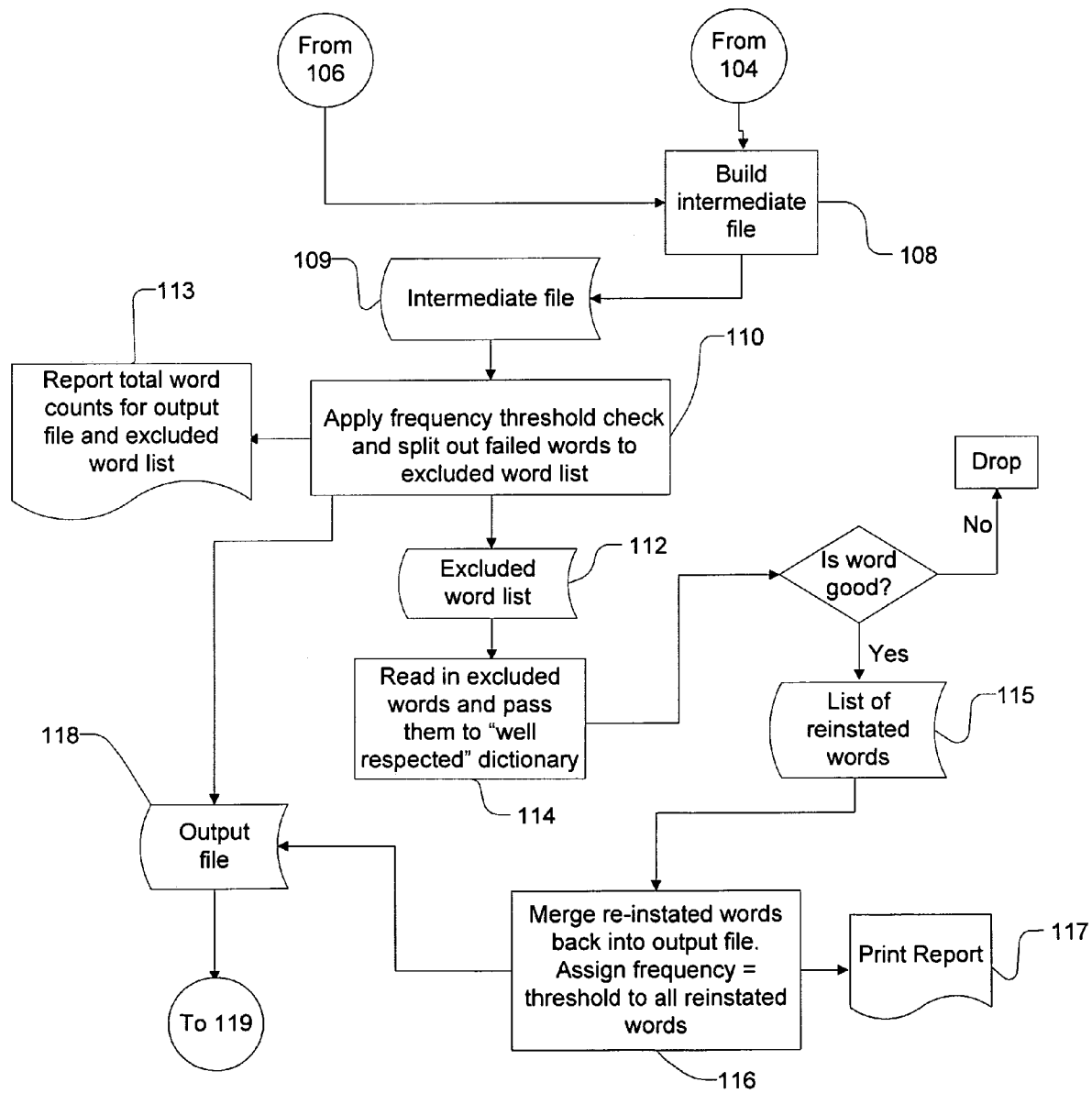
FIG. 2A is a high level flow diagram that is a detailed view of the area designated 2A in FIG. 2.
Figure 3:
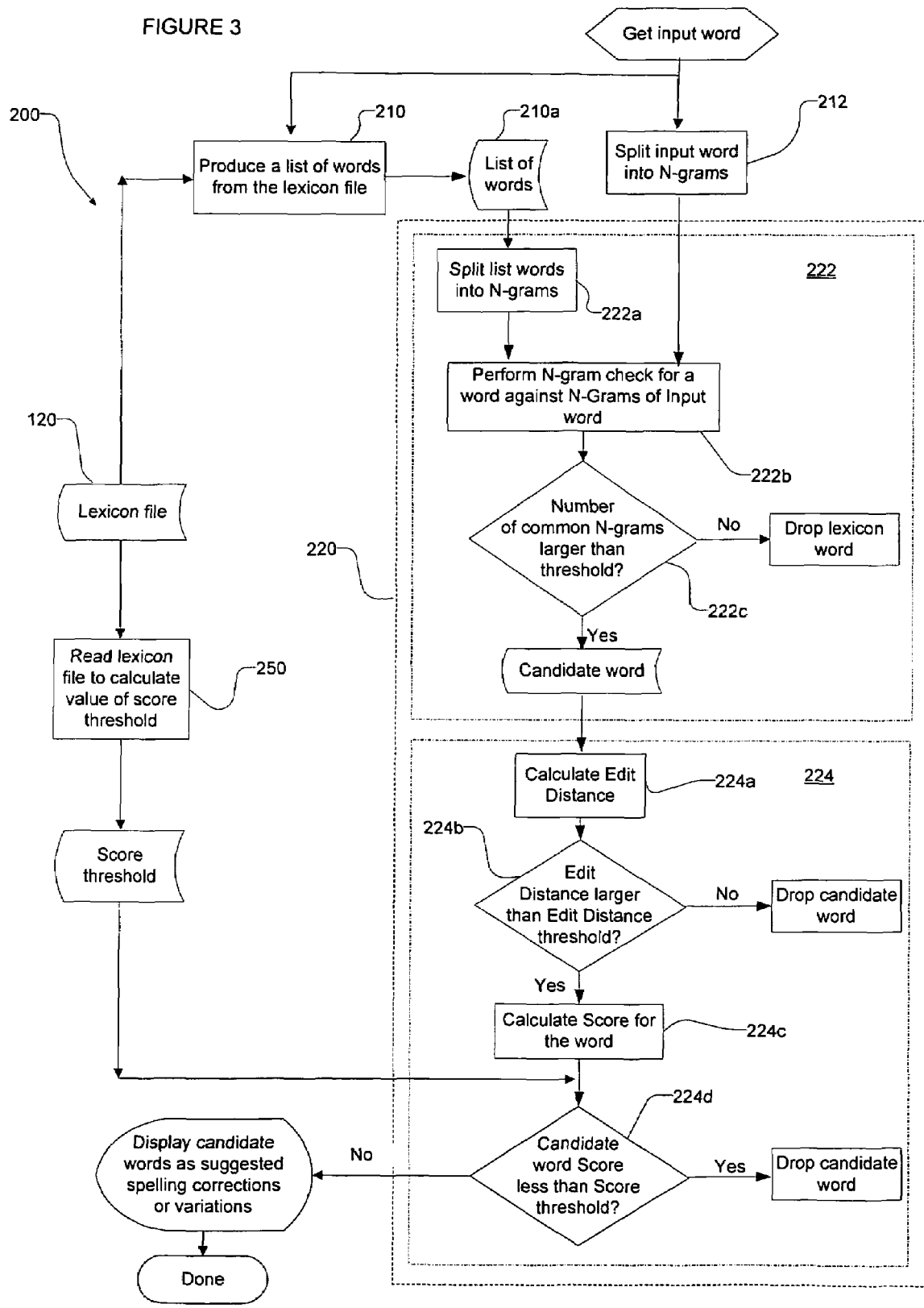
FIG. 3 is a high level flow diagram illustrating the spell checking process in according to the present invention.

Referring now to FIG. 2, a control card 101 contains a list of menu/library/file combinations of a classification hierarchy of databases 106 that will be used to construct the lexicon file. The menu/library/files specified on the control card 101 is used as a key to read a menu metadata file 102 to obtain a list 104 of the databases 106.

In step 103, control cards 101 are read to obtain menu/library/file combinations of a topical hierarchy. Using the menu/file as a key, the menu file 102 is read to produce a list of database numbers 104 corresponding to the databases 106 used as input to construct the lexicon file.

In step 105, the list of database numbers 104 is sorted and duplicate database numbers (corresponding to duplicate databases 106) are removed.

In step 108, words of the same length (slices) are read from each database 106 listed in the edited database number list 104, word frequency counts are accumulated, duplicate records are removed, and records are written into an intermediate file 109. In step 108, the records also optionally can be sorted by ascending alphabetical order of word, although it is not necessary to do so. The intermediate file 109 created in step 108 contains all the words of the same length from all databases 106 that are eligible for spell checker processing. An intermediate file 109 is built for each slice (i.e., for each set of words of the same length); and comprises a header and a data section. Words are stored in the intermediate file 109 in alphabetical order.

In step 110, a limit or threshold on word frequency is applied when records are selected from the intermediate file 109. If a record passes a threshold, it is copied into an output file 118. If it fails this threshold, then it is placed into an excluded word list 112. Also in step 110, a print utility outputs a report 113 on records counts going to the output file 118 and the excluded word list 112.

Words in the excluded word list 112 are passed to a "well-respected" dictionary to determine in step 114 if they are present in that dictionary (that is, to determine if they are correctly-spelled words). If they are present, then their corresponding records (which include the words and their frequencies) are written to a list of re-instated words 115.

In step 116, records from the list of re-instated words 115 are merged back into the output file 118. Also in step 116, a report 117 is generated on the slice number being processed, total words processed, and total number of words starting with each letter of the alphabet.

All records in the re-instated word list 115 have a low frequency value (lower than the threshold). Therefore, in step 116, the reinstated words are given a bonus by assigning them a frequency equal to the threshold value before merging them back into the output file 118.

Each output file 118 contains words of the same length from the all databases 106 that are eligible for processing by the spell checker 200. Each output file 118 comprises a header and a data section. After the output files 118 for all slices have been built, the process continues with a merge in step 119.

In step 119, a merge program merges all output files 118 into one lexicon file 120. The lexicon file 120, output from the lexicon builder 100, contains all words and all slices that are eligible for processing by the spell checker 200. These words are referred to herein as "lexicon words." The lexicon file 120 includes a header and a data section. Also in step 119, a merge report 121 is created, which reports on total terms processed and total number of words per starting letter per slice.

With the creation of the lexicon file 120, the lexicon build process is complete.

The spell checker 200 provides the user with suggested correct spellings of input words and with variant spellings of input words. The spell checker 200 includes a list build process 210 followed by a two-pass spell checker algorithm 220.

The list build process 210 produces a list 210a of all lexicon words that start with the same letter as an input word and have a word length in the range of Input Word Length−K to Input Word Length+K, where K is a constant. In a working embodiment of the invention, it was found that K=2 yields a good result. Experiments conducted with higher values demonstrated that a larger length difference (that is, a higher value of K) does not improve the quality of the final spelling suggestion.

In step 212, prior to execution of the spell checker algorithm 200, the input word is split into N-grams (combinations of N adjacent letters that comprise a word).

The spell checker algorithm 220 comprises two passes 222 and 224. In conjunction with the list build process 210, the first pass 222 provides a "coarse" checking of all the words in the list 210a based on "similarity" to the input word. In step 222a, each word in the list 210a is split into N-grams. For an input word having a length of less than or equal to four letters (≦4), steps 212 and 222a split the input word and words from the list 210a into uni-grams (groups of one letter). For an input word having a length of greater than four letters (>4), steps 212 and 222a, respectively, split the input word and words from the list 210a into bi-grams. For example, the input word ABLILTY contains six bi-grams: AB, BL, LI, IL, LT, and TY. In step 222b, each word in the list 210a is checked to determine the number of "common N-grams" with the input word.

Using the above example of the input word ABLILTY, there is shown in Table 2 the method for finding "common N-grams." With reference to Table 2, for each N-gram (in this example, each bi-gram) from a word in the list 210a, check whether it matches a bi-gram in the input word that is:

located in the same letter positions as in the input word; OR shifted one position to the left or to the right from its position in the input word.

TABLE 2

| Input word: | ABLILTY | | | | | |
|---|---|---|---|---|---|---|
| Position | 12 | 23 | 34 | 45 | 56 | 67 |
| Bi-grams | AB | BL | LI | IL | LT | TY |
| Lexicon word | ABILITY | | | | | |
| Position | 12 | 23 | 34 | 45 | 56 | 67 |

TABLE 2-continued

| Bi-gram | AB | BI | IL | LI | IT | TY | Position |
|---------|----|----|----|----|----|----|----------|
| | match | | | | | | First bi-gram |
| | | no match | | | | | Second bi-gram |
| | | | match | | | | Third bi-gram |
| | | | | match | | | Fourth bi-gram |
| | | | | | no match | | Fifth bi-gram |
| | | | | | | match | Sixth bi-gram |

In the example shown in Table 2, the lexicon word from the list 210a has matched bi-grams "AB" (matches Positions 1, 2 in the input word), "IL" (matches Positions 4, 5 in the input word), "LI" (matches positions 3, 4 in the input word), and "TY" (matches Positions 6, 7 in the input word). Thus, there are four matched bi-grams out of a total of six.

In step 222c, each word from the list 210a that has a number of matched N-grams ≧50% of the total number of bi-grams in the input word is selected as a candidate word for the second pass 224 of the spell checker 200.

The second pass 224 determines which, if any, candidate words to present to the user as suggested spelling corrections and/or variations. In step 224a, an Edit Distance value between an input word and a candidate word is calculated. The Edit Distance value is the number of steps (insert letter, delete letter, transpose two adjacent letters) to transform an input word to a candidate word. In step 224b, if the Edit Distance value for a candidate word is larger than a pre-determined Edit Distance threshold, then the candidate word is dropped from consideration.

In step 224c, the second pass 224 calculates a score value for each of the candidate words from the file 210a according to a formula. The formula used to calculate the score value ("the score formula") combines two factors, similarity and frequency, and also gives a "bonus" to candidate words that end with the same letter as an input word.

The similarity factor is obtained using the Edit Distance value calculated in step 224a. The algorithm for calculating the Edit Distance value is very slow and time consuming. If the score value were calculated for every word in the lexicon file 120 (even if the calculation were restricted only to words starting with the same letter as an input word), it would not be possible to provide spelling suggestions in a reasonable response time. Therefore, the list builder process 210 and the first pass 222 provide a "coarse" checking of words in the lexicon file 120 based on "similarity" to the input word, without missing any words that would be good candidates (that is, similar to the input word and having a high frequency).

The score formula can be presented as:

$$\text{SCORE} = w\text{Edit} \times (N\text{MAX} - \text{EditDistance}) + w\text{Frequency} \times (F_{ND} + (0.1 \times F_{HD})) + (w\text{LastCharBonus} \times LB1) \quad \text{(Equation 1)}$$

where:

wEdit and wFrequency are experimentally-determined weight factors;

NMAX is the Edit distance threshold value, which is an experimentally-determined constant;

EditDistance (which is calculated in step 231) is the enhanced Levenstein edit distance, which is defined as the minimal costs involved to transform one string into another by using three elementary operations: deletion, insertion and substitution of a letter (for example, to transform "water" into "wine", substitute "i" for "a" to arrive at "witer," substitute "n" for "t" to arrive at "winer," and delete "r" to arrive at "wine", for an edit distance between "water" and "wine" of 3, representing the application of three operations), and where the transposition of two adjacent letters is given a value of 1;

$F_{ND}$ is the number of decimals in the candidate word's frequency;

$F_{HD}$ is the high decimal digit in the candidate word's frequency;

wLastCharBonus is an experimentally-determined weight factor; and

LB1 is determined by the condition:

LB1=1 if the last letter of the input word matches the letter of a lexicon word wEdit, wFrequency, and wLastCharBonus are constant for a particular type of data source. wEdit and wFrequency are experimentally determined based on experiments and assessments of quality of spelling suggestions for various values thereof, the results of the tests suggest the optimal values wEdit=3, wFrequency=1, and wLastCharBonus=1 for legal data sources in English such as those present in the Lexis™ online legal research system. NMAX is similarly experimentally determined to have an optimum value of 4.

The threshold score value for suggested correct spellings and spelling variations is calculated in step 250 as a percentage of the absolute maximum score value for the words in the lexicon files. The value of the percentage is determined experimentally. It is a constant value for each lexicon file 120, but can vary for different lexicon files 120 (that is, the value will depend upon the data source). In step 224d, all candidate words that have a score lower than threshold value are dropped (that is, not presented to the user).

Assume, for example, that:

NMAX=4, wEdit=3, wLastCharBonus=1, and wFrequency=1.

For the input word "ACHIEVMENT," the candidate words and their frequencies are as shown in Table 3:

TABLE 3

| Word | Frequency |
|------|-----------|
| ACHIEVEMENT | 3,605,667 |
| ACHIEVMNT | 30 |
| ACHIEVER | 175,853 |

The input word and the candidate words have corresponding edit distances as shown in Table 4:

TABLE 4

| Word | Edit Distance |
|---|---|
| ACHIEVEMENT | 1 |
| ACHIEVMNT | 1 |
| ACHIEVER | 4 |

The "score" for each candidate word is then calculated in step 224c as follows:

SCORE(ACHIEVEMENT)=3(4−1)+1(6+(0.1×3))+ 1=16.3

SCORE(ACHIEVMNT)=3(4−1)+1(1+(0.1×3))+ 1=11.3

SCORE(ACHIEVER)=3(4−4)+1(5+(0.1×1))=5.1

Thus, the spell checker algorithm 210 determines that "ACHIEVEMENT" is a suggested spelling correction or variation for the input word "ACHIEVMNT."

Another example is the word that is spelled "COLOR" in U.S. usage and "COLOUR" in British usage. In an exemplary U.S. lexicon file, the respective frequencies for "COLOR" and "COLOUR" are as shown in Table 4:

TABLE 5

| Word | Frequency |
|---|---|
| COLOR | 7,533,098 |
| COLOUR | 300,755 |

In contrast, in an exemplary British lexicon file, the respective frequencies for "COLOR" and "COLOUR" are as shown in Table 6:

TABLE 6

| Word | Frequency |
|---|---|
| COLOR | 5,398 |
| COLOUR | 12,323,464 |

Thus, for U.S. data:

SCORE(COLOR)=3(4−0)+1(6+(0.1×7))+1=19.7

SCORE(COLOUR)=3(4−1)+1(5+(0.1×3))+1=15.3

Because the score for "COLOR" is higher than the frequency factor for "COLOUR" in the U.S. lexicon file, "COLOR" is considered to be a correct spelling.

On the other hand, for British data:

SCORE(COLOR)=3(4−0)+1(3+(0.1×5))+1=16.5;

SCORE(COLOUR)=3(4−1)+1(7+(0.1×1))+1=17.1;

Therefore, in the British lexicon file, "COLOR" is considered to be a misspelling and will be corrected to read "COLOUR."

It is to be understood that the present invention is not limited to the illustrated user interfaces or to the order of the user interfaces described herein. Various types and styles of user interfaces may be used in accordance with the present invention without limitation.

Modifications and variations of the above-described embodiments of the present invention are possible, as appreciated by those skilled in the art in light of the above teachings. It is therefore to be understood that, within the scope of the appended claims and their equivalents, the invention may be practiced otherwise than as specifically described.

What is claimed is:

1. Computer-implemented apparatus for making multilingual spelling corrections for an input word in a search query directed against a data source, comprising:
   lexicon builder means executed by a computer processor for building a lexicon file using the words in the data source against which the search query is targeted; and
   spell checker means for providing suggested correct spellings and variant spellings of the input word in the search query by checking the input word against the lexicon file, wherein the spell checker means includes means for creating a subset of candidate words from the lexicon file, and wherein the means for creating a subset of candidate words includes:
   means for splitting the input word and each word in the lexicon file into N-grams based on the length of the input word and for each N-gram of each word in the lexicon file, determining whether it matches an N-gram in the input word and
   means for checking only those words in the lexicon file that start with the same letter as an input word and having a word length in the range of Input Word Length−K to Input Word Length+K based on the number of matching N-grams with the input word, where Input Word Length is the number of letters in the input word and where K is a constant.

2. The apparatus of claim 1, wherein the lexicon builder means includes:
   means for testing words in the data source against a threshold value for frequency and for testing words in the data source that fail the threshold value for presence in a well-respected dictionary, and
   means for excluding from the lexicon file words that fail the threshold value for frequency and that are not present in the well-respected dictionary.

3. The apparatus of claim 1, wherein the spell checker means includes:
   means for calculating a score for each of the candidate words and for choosing suggested spelling corrections and spelling variations based on the calculated score for each of the candidate words.

4. The apparatus of claim 3, wherein the score calculated by the means for calculating and choosing is calculated according to a formula utilizing enhanced Levenstein edit distance, number of decimals in the word's frequency, the high decimal digit in the word's frequency, and a bonus to candidate words ending with the same letter as the input word.

5. The apparatus of claim 3, wherein the score calculated by the means for calculating and choosing is calculated according to the formula SCORE=$w$Edit×($N$MAX−EditDistance)+$w$Frequency×($F_{ND}$+(0.1×$F_{HD}$))+($w$LastCharBonus× $LB$1)

where:
   wEdit and wFrequency are experimentally determined weight factors;
   NMAX is the Edit distance threshold value, which is an experimentally determined constant;
   EditDistance is the enhanced Levenstein edit distance;
   $F_{ND}$ is the number of decimals in the word's frequency;
   $F_{HD}$ is the high decimal digit in the word's frequency;
   wLastCharBonus is an experimentally-determined weight factor; and LB1 is determined by the condition LB1=1 if the last letter of the input word matches the letter of a lexicon word.

6. The apparatus of claim 3, wherein the means for calculating and choosing includes means for testing the calculated score for each candidate word against a score threshold and for excluding as spelling correction words candidate words having a calculated score less than the score threshold.

7. The apparatus of claim 6, wherein the threshold score value is calculated as a percentage of the absolute maximum score value for the words.

8. The apparatus of claim 7, wherein the value of the percentage is determined experimentally.

9. The apparatus of claim 6, wherein the threshold score value is a constant that depends upon the data source.

10. The apparatus of claim 1, wherein the means for creating a subset checks each word in the lexicon file for N-gram matches located in the same position as in the input word or shifted on position to the left or to the right from its position in the input word.

11. The apparatus of claim 1, wherein the means for creating a subset of candidate words uses uni-grams for input words having a length less than or equal to a predetermined number of letters and uses bi-grams for input words having a length greater than the predetermined number of letters.

12. The apparatus of claim 1, wherein all words in the lexicon file having a number of matched N-grams greater than or equal to a predetermined percentage of the total number of N-grams in the input word are selected as candidate words.

13. A computer-implemented method for making multilingual spelling corrections for an input word in a search query directed against a data source, comprising:
building using a computer processor to build a lexicon file using the words in the data source against which the search query is targeted; and
providing suggested correct spellings and variant spellings of the input word in the search query by checking the input word against the lexicon file and creating a subset of candidate words from the lexicon file, wherein the step of creating a subset of candidate words includes:
splitting each input word and each word in the lexicon file into N-grams based on the length of the input word;
for each N-gram of each word in the lexicon file, determining whether it matches an N-gram in the input word; and
checking only those words in the lexicon file that start with the same letter as each input word and having a word length in the range of Input Word Length−K to Input Word Length+K based on the number of "common N-grams" with the input word, where Input Word Length is the number of letters in the input word and where K is a constant.

14. The method of claim 13, wherein the step of building a lexicon file includes the further steps of:
testing words in the data source against a threshold value for frequency and testing words in the data source that fail the threshold value for presence in a well-respected dictionary, and
excluding from the lexicon file words that fail the threshold value for frequency and that are not present in the well-respected dictionary.

15. The method of claim 13, wherein the step of providing suggested correct spellings and variant spellings includes the further step of:
calculating a score for each of the candidate words and choosing suggested spelling corrections and spelling variations based on the calculated score for each of the candidate words.

16. The method of claim 15, wherein in the step of calculating and choosing, the score is calculated according to a formula utilizing enhanced Levenstein edit distance, number of decimals in the word's frequency, the high decimal digit in the word's frequency, and a bonus to candidate words ending with the same letter as the input word.

17. The method of claim 15, wherein in the step of calculating and choosing, the score is calculated according to the formula $$SCORE = w\text{Edit} \times (N\text{MAX} - \text{EditDistance}) + w\text{Frequency} \times (F_{ND} + (0.1 \times F_{HD})) + (w\text{LastCharBonus} \times LB1)$$

where:
wEdit and wFrequency are experimentally determined weight factors;
NMAX is the Edit distance threshold value, which is an experimentally determined constant;
EditDistance is the enhanced Levenstein edit distance;
$F_{ND}$ is the number of decimals in the word's frequency;
$F_{HD}$ is the high decimal digit in the word's frequency;
wLastCharBonus is an experimentally-determined weight factor; and
LB1 is determined by the condition LB1=1 if the last letter of the input word matches the letter of a lexicon word.

18. The method of claim 15, wherein the step of calculating and choosing includes testing the calculated score for each candidate word against a score threshold and excluding as spelling correction words candidate words having a calculated score less than the score threshold.

19. The method of claim 18, wherein in the step of calculating and choosing, the threshold score value is calculated as a percentage of the absolute maximum score value for the words.

20. The method of claim 19, wherein in the step of calculating and choosing, the value of the percentage is determined experimentally.

21. The method of claim 18, wherein in the step of calculating and choosing, the threshold score value is a constant that depends upon the data source.

22. The method of claim 13, wherein the step of creating a subset includes checking each word in the lexicon file for N-gram matches located in the same position as in the input word or shifted on position to the left or to the right from its position in the input word.

23. The method of claim 13, wherein the step of creating a subset of candidate words includes using uni-grams for input words having a length less than or equal to a predetermined number of letters and using bi-grams for input words having a length greater than the predetermined number of letters.

24. The method of claim 13, wherein all words in the final lexicon having a number of matched N-grams greater than or equal to a predetermined percentage of the total number of N-grams in the input word are selected as candidate words.

* * * * *